US012521077B2

United States Patent
Lee et al.

(10) Patent No.: US 12,521,077 B2
(45) Date of Patent: Jan. 13, 2026

(54) AI-AIDED COMPUTED TOMOGRAPHY USING 3D SCANOGRAM FOR AUTOMATED LENS PROTECTION

(71) Applicant: CANON MEDICAL SYSTEMS CORPORATION, Tochigi (JP)

(72) Inventors: Tzu-Cheng Lee, Vernon Hills, IL (US); Liang Cai, Vernon Hills, IL (US); Jian Zhou, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 314 days.

(21) Appl. No.: 18/323,016

(22) Filed: May 24, 2023

(65) Prior Publication Data

US 2024/0389961 A1    Nov. 28, 2024

(51) Int. Cl.
   *A61B 6/00*    (2024.01)
   *A61B 6/03*    (2006.01)
   *A61B 6/04*    (2006.01)

(52) U.S. Cl.
   CPC .............. *A61B 6/488* (2013.01); *A61B 6/032* (2013.01); *A61B 6/04* (2013.01); *A61B 6/4447* (2013.01); *A61B 6/542* (2013.01)

(58) Field of Classification Search
   CPC ........... A61B 6/488; A61B 6/032; A61B 6/04; A61B 6/4447; A61B 6/542; A61B 6/107; A61B 6/405; A61B 6/501; A61B 6/545; A61B 6/54; A61B 6/035; A61B 6/4208; A61B 6/4233; A61B 6/467; A61B 6/503; A61B 6/5211; G06N 3/0464; G06N 3/08; G06T 11/003
   See application file for complete search history.

(56) References Cited

U.S. PATENT DOCUMENTS

2018/0070908 A1*  3/2018  Netabayashi ........ A61B 6/4035

FOREIGN PATENT DOCUMENTS

EP        4 311 494 A1    1/2024

OTHER PUBLICATIONS

Extended European Search Report issued on Oct. 25, 2024 in European Patent Application No. 24177813.3, 11 pages.
AAPM: "Adult routine head CT protocols version 2.0", Guidelines of the American Association of Physicists in Medicine, Mar. 1, 2016, XP093215859, pp. 1-20.
Buelow et al., "Automatic Assessment of the Quality of Patient Positioning and Field of View of Head CT Scans", Progress in Biomedical Optics and Imaging, SPIE—International Society for Optical Engineering, Bellingham, WA, US, vol. 10954, XP060121483, pp. 1-13 2019.

* cited by examiner

*Primary Examiner* — Courtney D Thomas
(74) *Attorney, Agent, or Firm* — Oblon, McClelland, Maier & Neustadt, L.L.P.

(57) ABSTRACT

A method of controlling computed tomography (CT) scanning includes performing a scout CT scan of a 3D region of a head of a subject to be examined, using a CT gantry having an X-ray source and an X-ray detector both rotatably supported thereby, to produce image data. Anatomical landmarks are detected for identifying an orbitomeatal base line (OMBL), by inputting cross-sectional image data of the 3D region generated from the image data to a trained machine learning model. A tilt angle of the CT gantry is determined based on the detected anatomical landmarks. A diagnostic CT scan of the object is performed using the CT gantry tilted at the determined tilt angle.

19 Claims, 17 Drawing Sheets

AI-AIDED COMPUTED TOMOGRAPHY USING 3D SCANOGRAM FOR AUTOMATED LENS PROTECTION

Embodiments described herein relate generally to an X-ray CT (Computed Tomography) apparatus and method and, more particularly, to an X-ray CT apparatus and method having automatic gantry tilting for eye protection.

BACKGROUND

An X-ray CT apparatus is a medical image diagnostic apparatus which acquires projection data of an object from plural angles by rapidly rotating an X-ray source about the object placed on a table. An X-ray CT apparatus generates a two-dimensional CT image and/or a three-dimensional CT image by reconstructing plural projection data acquired for respective angles.

In a scan mode called a helical scan, a relative positional relationship between an X-ray source and an object is changed while the X-ray source is being continuously rotated, and projection data of the whole body of the object can be acquired by one scan. When an object is imaged by using an X-ray CT apparatus, the object is generally placed on a table such that the body axis direction (i.e., head-to-foot direction) of the object is along the longitudinal direction of the table (i.e., the z-axis direction of the apparatus coordinate system described below) and a scan is performed while the table is being moved in the z-axis direction.

In an examination using an X-ray CT apparatus, a prescan for acquiring projection data of a scanogram or scout image is performed prior to a main scan in which projection data of medical images for image diagnosis are acquired. A scanogram or scout image is an image acquired with low exposure dose prior to a main scan in order to determine imaging conditions of the main scan, such as exposure dose and an imaging range, and offers the functions of assisting subject centering and positioning and allowing selection of an anatomical target for the following CT scan.

However, traditional 2D scanograms usually provide only the L-R and A-P direction of a radiograph. As such, the scanograms have the limitations of being difficult to delineate soft tissue organs and being sub-optimal for tube current modulation. In recent years the ultra-low dose 3D scanogram, on the other hand, has shown advantages for overcoming limitations in 2D scanogram (e.g., better soft tissue resolution and organ-based modulation) by offering full 3D anatomical information while maintaining low-enough radiation dose (<1 mGy).

Radiation exposure on the lens of the eye during head and neck CT scans may increase a subject's risk of developing cataracts and opacities. See Nikupaavo, U. et al., Lens Dose in Routine Head CT: Comparison of Different Optimization Methods With Anthropomorphic Phantoms. *AJR* 2015; 204:117-123 and Mosher, E. et al., Lens Dose Reduction by Patient Posture Modification During Neck CT. *AJR* 2018; 210:1111-1117. The radiation exposure of the lens and other radiation-sensitive tissues can be reduced by use of technical solutions such as organ-based tube current modulation (OB-TCM), local exterior shielding and optimization of the gantry tilt angle. Studies has shown that gantry tilt is an effective method for reducing direct exposure of eye lenses in CT of the brain scan without compromising imaging quality. See also Mussmann, B. et al., Organ-based tube current modulation in chest CT. A comparison of three vendors. *Radiography* 2021 February; 27(1):1-7. CT apparatuses may include a gantry tilt function on the system so that direct radiation exposure on subject's lens can be reduced in routine brain scans.

Although gantry tilt or subject positioning (head tilt) are part of basic CT technologist training and it has be shown that tilting helps lower the dose exposure on lenses, it has long been observed that compliance for many clinical sites is generally low. See Filice, R., Lens Identification to Prevent Radiation-Induced Cataracts Using Convolutional Neural Networks. Journal of Digital Imaging (2019) 32:644-650 and Deshpande, H. et al., Deep Learning for the Detection of Landmarks in Head CT Images and Automatic Quality Assessment. Proc. SPIE 11596, Medical Imaging 2021: Image Processing, 115960N (15 Feb. 2021); doi: 10.1117/12.2581810. Retrospective research from Georgetown University Hospital shows only around 10% of head CT examinations comply with the guidance of lens protection. This is likely because the positioning techniques require manual operations through laser markers (and/or 2D scanogram) to exclude the lenses. It can be challenging and somewhat subjective. Moreover, a gantry-tilt tuning process is relative time-consuming compared to the total CT acquisition time. Subject movement after the positioning can also result in undesired exposure of the lenses.

Thus, it has been desired to provide technology to automatically set imaging conditions to automate CT head examinations through subject positioning and gantry tilting so that lens protection can be properly performed and overall subject throughput can be improved.

SUMMARY

An embodiment according to the disclosure is directed to a method of controlling computed tomography (CT) scanning includes performing a scout CT scan of a 3D region of a head of a subject to be examined, using a CT gantry having an X-ray source and an X-ray detector both rotatably supported thereby, to produce image data. Anatomical landmarks are detected for identifying a tilt plane positioned to avoid irradiation of the lenses of the subject during a subsequent diagnostic CT scan, by inputting cross-sectional image data of the 3D region generated from the image data to a trained machine learning model. A tilt angle of the CT gantry is determined based on the detected anatomical landmarks. The diagnostic CT scan of the object is performed using the CT gantry tilted at the determined tilt angle.

The CT scout scan and the diagnostic CT scan may be performed consecutively in one scanning operation. In another embodiment, performing the CT scout scan includes increasing an X-ray dosage for a specific view acquisition having a specific rotational position so as to identify the OMBL.

The tilt plane may be defined using an orbitomeatal base line (OMBL) of the subject or using a supraorbital ridge and an opisthion of the subject.

Another embodiment of the method of controlling CT scanning includes performing a scout CT scan of a three-dimensional (3D) region of an object to be examined, using a CT gantry having an X-ray source and an X-ray detector both rotatably supported thereby, to produce image data. Anatomical landmarks in the image data are identified by inputting cross-sectional image data of the 3D region generated from the image data to a trained machine learning model. A tilt angle of the CT gantry is determined based on the identified anatomical landmarks and a diagnostic CT scan of the object is performed using the CT gantry tilted at the determined tilt angle.

A still further embodiment according to the disclosure is directed to a CT apparatus having a gantry, an X-ray source and X-ray detector mounted on the gantry, and a memory storing a trained model configured to detect anatomical landmarks. The apparatus also includes processing circuitry configured to instruct the apparatus to perform a scout CT scan of a three-dimensional (3D) region of an object to be examined to produce image data; input the image data to the trained model to detect anatomical landmarks; determine a tilt angle of the CT gantry based on the detected anatomical landmarks; and perform a diagnostic CT scan of the object using the CT gantry tilted at the determined tilt angle.

DETAILED DESCRIPTION

Hereinafter, X-ray CT apparatuses of respective embodiments will be described by referring to the accompanying drawings.

Since an imaging range is different depending on a gender and/or a body type of an object, it is preferable that an imaging range is appropriately set for each object. A conventional method of setting imaging conditions uses various types of template images in which each anatomical landmark (hereinafter, shortly referred to as an AL) stored in a database is extracted.

In each template image, an imaging range is defined in accordance with an anatomical site. Thus, it is possible to determine an imaging range of an object by performing coordinate transformation on the imaging range defined in the template image on the basis of ALs extracted from the scanogram image and ALs of the template image.

An X-ray CT apparatus can image an object under any of various scan modes such as a helical scan and a rotational scan. For instance, a variable helical pitch scan (hereinafter, referred to as a vHP scan) is known as one of scan modes of an X-ray CT apparatus. In a vHP scan, a wide range is imaged while imaging conditions are being switched for each of predetermined imaging ranges.

In the case of imaging the whole body under a vHP scan, an electrocardiographic synchronous scan is performed on the imaging range which includes the heart. In an electrocardiographic synchronous scan, e.g., imaging conditions are set in such a manner that projection data are acquired at a cardiac time phase at which influence of a heart beat is small in one cycle of a heartbeat. In other words, projection data of a predetermined cardiac time phase necessary for image reconstruction are acquired over plural heartbeats. Thus, in an imaging range including the heart in a vHP scan, table moving velocity is set at slower velocity as compared with other imaging ranges which do not include the heart.

When table moving velocity is slower, a time span during which an object is exposed to X-ray irradiation is longer and thus X-ray exposure to the object is increased. However, when the table is moved beyond the X-ray beam-width in the slice direction in one cycle of a heartbeat, the cardiac CT image to be reconstructed includes a missing part in the z-axis direction.

For the above reasons, the present inventors have worked out innovative configuration in which an imaging range is automatically set as narrowly as possible within a range where satisfactory image quality is maintained in terms of diagnosis. According to this configuration, it is possible to reduce total exposure dose in the entire imaging by minimizing an imaging range exposed to a large dose of X-rays under a condition where satisfactory image quality is maintained for a CT image to be acquired.

Hereinafter, a description will be given of embodiments of X-ray CT apparatuses equipped with the configuration of setting an imaging range in the above-described manner.

First Embodiment

Figure 1:
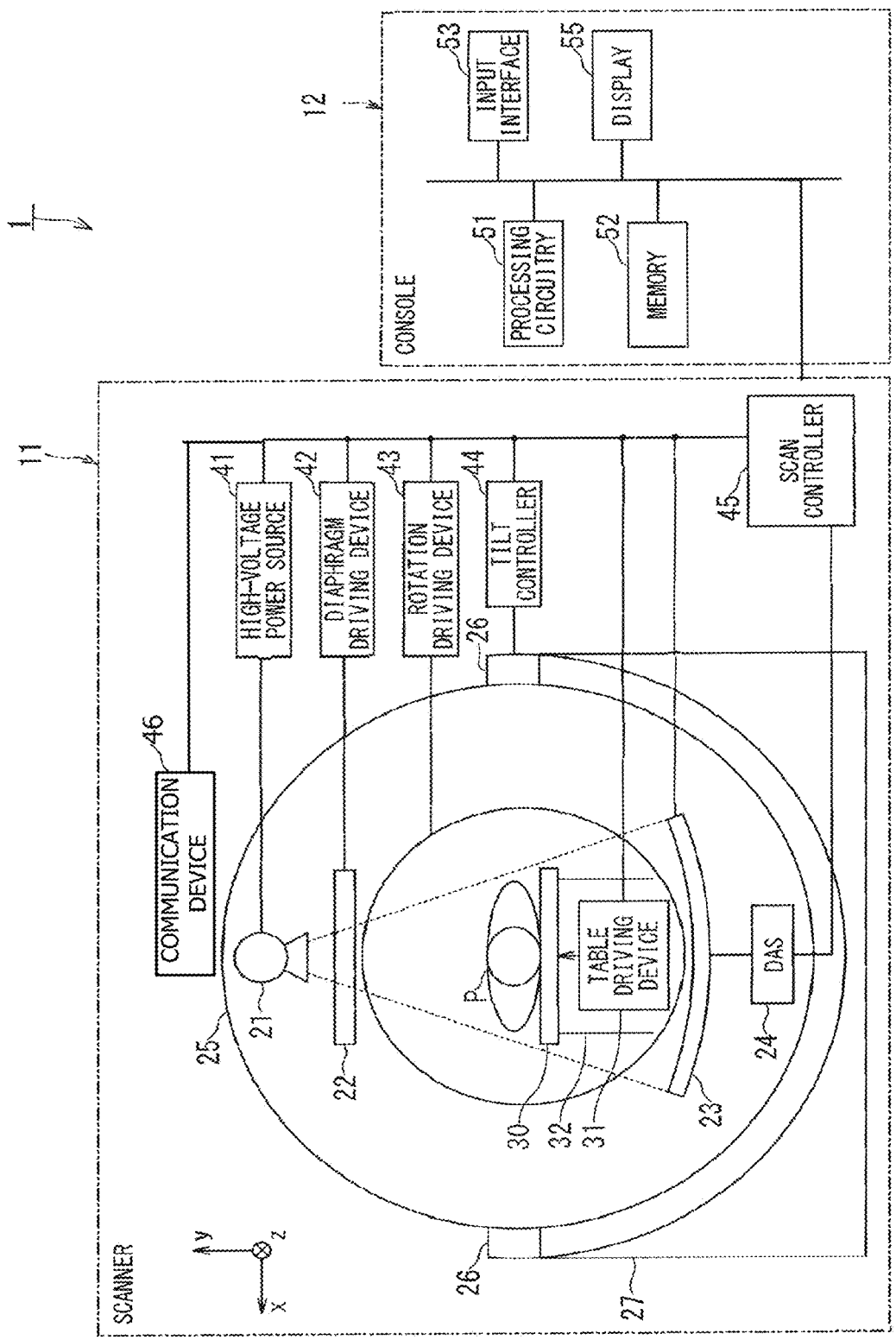
FIG. 1 is a general block diagram illustrating configuration of the X-ray CT apparatus 1A in the first embodiment.

FIG. 1 is a general block diagram illustrating a configuration of the X-ray CT apparatus 1 in the first embodiment. The X-ray CT apparatus 1 shown in FIG. 1 includes a scanner 11 and a console 12.

The scanner 11 is installed in an examination room, and acquires projection data of an object P. The console 12 is installed in a control room which is adjacent to the examination room, and generates a CT image by reconstructing projection data inputted from the scanner 11.

The scanner 11 includes a rotating body 25, a table driving device 31, a high-voltage power source 41, a diaphragm driving device 42, a rotation driving device 43, a tilt controller 44, scan controller 45, and communication device 46. For example, device 46 may be a speaker/microphone to speak with the subject.

The rotating body 25 is a frame (i.e., housing) configured to rotatably support an X-ray tube 21, an X-ray detector 23, and a non-illustrated cooler described below, and is fixed to a base 27 with a non-illustrated fixed base. Under the control of the scan controller 45, the rotation driving device 43 causes the rotating body 25 to rotate about a rotational axis which is in parallel with the z-axis of the apparatus coordinate system.

As an example, the x-axis, the y-axis, and the z-axis of the apparatus coordinate system is defined as follows: the vertical direction is defined as the y-axis direction; the z-axis is defined as the direction which is perpendicular to the y-axis and in parallel with the horizontal moving direction (i.e., the longitudinal direction) of the table; and the x-axis is defined as the direction which is perpendicular to both of the y-axis and the z-axis. In the present embodiment, it is assumed that the object P is placed on the table such that its body-axis direction matches the z-axis direction, unless otherwise specifically noted.

The rotating body 25 and the fixed base are tilted in the z-axis direction of the apparatus coordinate system by a tilt mechanism 26 which is provided between the fixed base and the base 27. The tilt mechanism 26 is equipped with a non-illustrated tilt bearing. The rotating body 25 and the fixed base integrally rotate about the tilt bearing. The tilt mechanism 26 tilts the rotating body 25 in accordance with a control signal inputted from the tilt controller 44 under the control of the scan controller 45. Details of a tilt operation of the rotating body 25 will be described below with reference to FIG. 2.

The rotating body 25 includes an opening. The table driving device 31 moves the table 30 with the object P placed thereon into the opening of the rotating body 25 at the time of imaging, and moves the table 30 to outside of the opening after completion of imaging. As an example here, the negative direction of the z-axis is defined as the moving direction of the table 30 from outside of the opening into inside of the opening section. In other words, the positive direction of the z-axis is defined as the moving direction of the table 30 from inside of the opening into outside of the opening. A supporting platform 32 is installed on the floor surface so as to support the table 30.

The table driving device 31 includes a non-illustrated table moving motor and a table moving mechanism. The table driving device 31 moves the table 30 upward and downward along the y-axis direction and horizontally moves the table 30 in the z-axis direction under the control of the scan controller 45.

The table moving mechanism is configured of, e.g., a rack and pinion mechanism. The table 30 moves along the rack meshing with the pinion (gear) by torque of the pinion which is generated by the table moving motor. Additionally, the table driving device 31 includes a non-illustrated stepping motor, and transmits position control information such as the current position of the table 30 and moving amount of the table 30 detected by the stepping motor to the scan controller 45.

The rotating body 25 includes an X-ray tube 21, an X-ray optical system 22, an X-ray detector 23, and a DAS (Data Acquisition System) 24.

The X-ray tube 21 generates an electron beam from its cathode in accordance with tube voltage supplied from the high-voltage power source 41, and generates X-rays by bombarding a metal target (i.e., its anode) with the electron beam. The X-rays generated by the X-ray tube 21 are radiated toward the X-ray detector 23. The X-ray tube 21 is supplied with electric power necessary for X-ray radiation under the control of the scan controller 45.

The X-ray optical system 22 controls an irradiation range of X-rays to be radiated onto the object P on the basis of a control signal from the diaphragm driving device 42 under the control of the scan controller 45. The X-ray optical system 22 is equipped with various types of control devices configured to control irradiation conditions such as dose of an X-ray beam, an irradiation range, a shape of an X-ray beam, and radiation quality. Specifically, the X-ray optical system 22 is equipped with, e.g., a wedge filter and a collimator. The wedge filter is a filter which is in the form of a convex-lens and formed of lightweight metal such as aluminum, and adjusts the dose of X-rays generated by the X-ray tube 21. The collimator is a slit for narrowing down an irradiation range of X-rays, dose of which has been controlled and adjusted by the wedge filter.

As an example of the X-ray detector 23, the X-ray detector 23 may be a two-dimensional array type detector in which many detection elements are arrayed in a matrix along the x-axis direction (i.e., the channel direction) and the slice direction. The X-ray detector 23 detects X-rays radiated from the X-ray tube 21. Note that the slice direction is perpendicular to the channel direction. As an example here, the slice direction is the direction of the rotational axis of the rotating body 25, and matches the z-axis direction under the condition where the rotating body 25 is not tilted, i.e., the tilt angle described below is zero degree. Additionally, the channel direction matches the x-axis direction regardless of the tilt state of the rotating body 25.

A two-dimensional array type detector is also referred to as a multi-slice type detector. When the X-ray detector 23 is a multi-slice type detector, it is possible to scan a three-dimensional region having width in the slice direction by rotating the rotating body 25 by 360 degrees or by 180 plus α degrees. A 3D scanogram or scout image can be obtained using the two-dimensional array type detector.

The DAS 24 includes a non-illustrated amplifier and an A/D (analog/digital) converter, amplifies signals of transmission data of X-rays detected by the respective detection elements of the X-ray detector 23, and converts the amplified transmission data into digital signals. The DAS 24 transmits projection data, which are generated on the basis of the transmission data detected by the X-ray detector 23, to the scan controller 45 via a non-illustrated data transfer device.

The console 12 of the X-ray CT apparatus 1 is configured on the basis of a computer, and can communicate with an external device via a network such as a LAN (Local Area Network). The console 12 is configured of hardware such as processing circuitry 51, a memory 52, an input interface 53, and a display 55.

The processing circuitry 51 is interconnected with the respective hardware components constituting the console 12 via a bus as a transmission path of common signals. Incidentally, the console 12 is equipped with a memory-medium drive in some cases.

The processing circuitry 51 may be configured of a special-purpose hardware or be configured to implement various types of functions by software processing of its built-in processor. As an example here, a description will be given of a case where the processing circuitry 51 implements various types of functions by software processing of its processor.

The above-described term "processor" means, e.g., a circuit such as a special-purpose or general-purpose CPU, a special-purpose or general-purpose graphics processing unit (GPU), an application specific integrated circuit (ASIC), a programmable logic device, and a field programmable gate array (FPGA). The above-described programmable logic device includes, e.g., a simple programmable logic device (SPLD) and a complex programmable logic device (CPLD). The processing circuitry 51 implements various types of functions by reading out programs stored in the memory 52 and executing the programs. Additionally or alternatively, the processing circuitry 51 implements various types of functions by reading out programs stored in its own processor and executing the programs.

Further, the processing circuitry 51 may be configured of a single processor or may be configured of a combination of plural processors which are independent of each other. In the latter case, plural memories 52 may be provided for the respective processors so that programs executed by each processor are stored in the memory 52 corresponding to this processor. As a further modification, one memory 52 may collectively store all the programs corresponding to the respective functions of the plural processors. The memory 52 is a memory medium including an external memory device such as a HDD (Hard Disk Drive) and an optical disc device in addition to a RAM (Random Access Memory) and a ROM (Read Only Memory). The memory 52 stores image data, data necessary for executing programs, and various types of programs executed by the processing circuitry 51 (including an application program and an operating system). Additionally, the memory 52 may store a program for controlling the operating system. Further, the memory 52 may store a program of a GUI (Graphical User Interface) which assists input from the input interface 53.

The input interface 53 is configured of input devices such as a keyboard, a mouse, a joystick, and a trackball. The input interface 53 receives input from a user via the input devices. When at least one input device is operated by an operator, the input interface 53 generates an input signal depending on this operation and outputs this input signal to the processing circuitry 51.

The display 55 is a display device such as a liquid crystal display panel, a plasma display panel, and an organic EL (Electro Luminescence) panel. The display 55 displays imaging conditions and images such as a scanogram image under the control of the processing circuitry 51.

Figure 2:
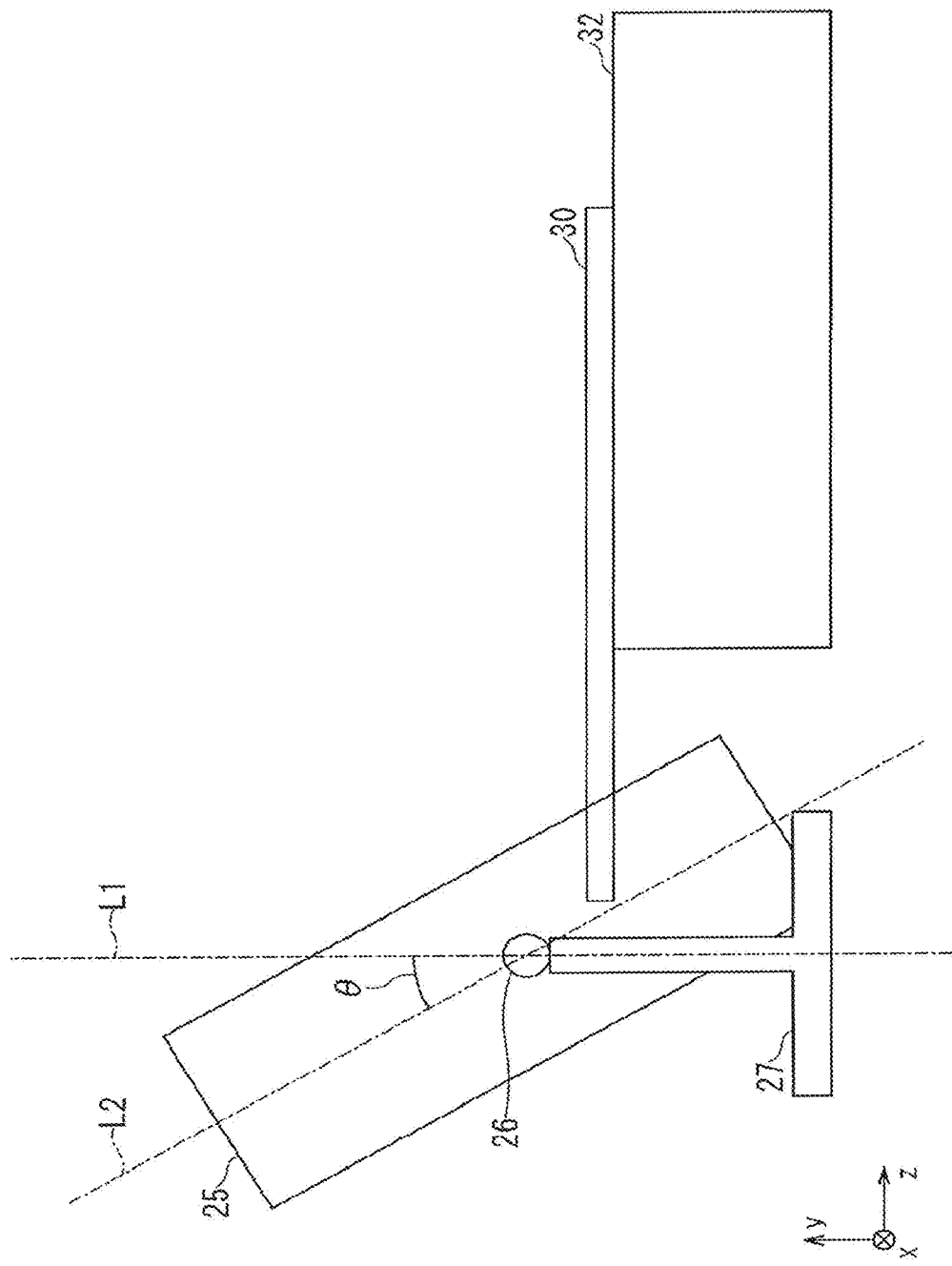
FIG. 2 is a schematic side view of the X-ray CT apparatus 1A of the first embodiment for describing the tilt mechanism.

FIG. 2 is a schematic side view of the X-ray CT apparatus 1 of the first embodiment for describing the tilt mechanism. FIG. 2 is a side view of the scanner 11 viewed from the x-axis direction under the state that the rotating body 25 is tilted. The chain line L1 in FIG. 2 is a straight line which is in parallel with the y-axis and passes through the center of the tilt mechanism 26. The chain line L2 is a straight line on the y-z plane and passes through the center of the tilt mechanism 26. A tilt angle $\theta$ is defined as the angle between the chain line L1 and the chain line L2.

Although a description has been given of the case where the rotating body 25 is tilted in the negative direction along the z-axis (i.e., backward tilting) in FIG. 2, the rotating body 25 can be tilted in the positive direction along the z-axis (i.e., forward tilting) in some cases. When the backward tilting is defined as the positive tilt direction and the forward tilting is defined as the negative tilt direction, the rotating body 25 is tilted in the positive or negative tilt direction within a predetermined angle range such that the reference angular position of the rotating body 25 is tilt angle 0 degree at which the chain line L2 matches the chain line L1.

Figure 3:
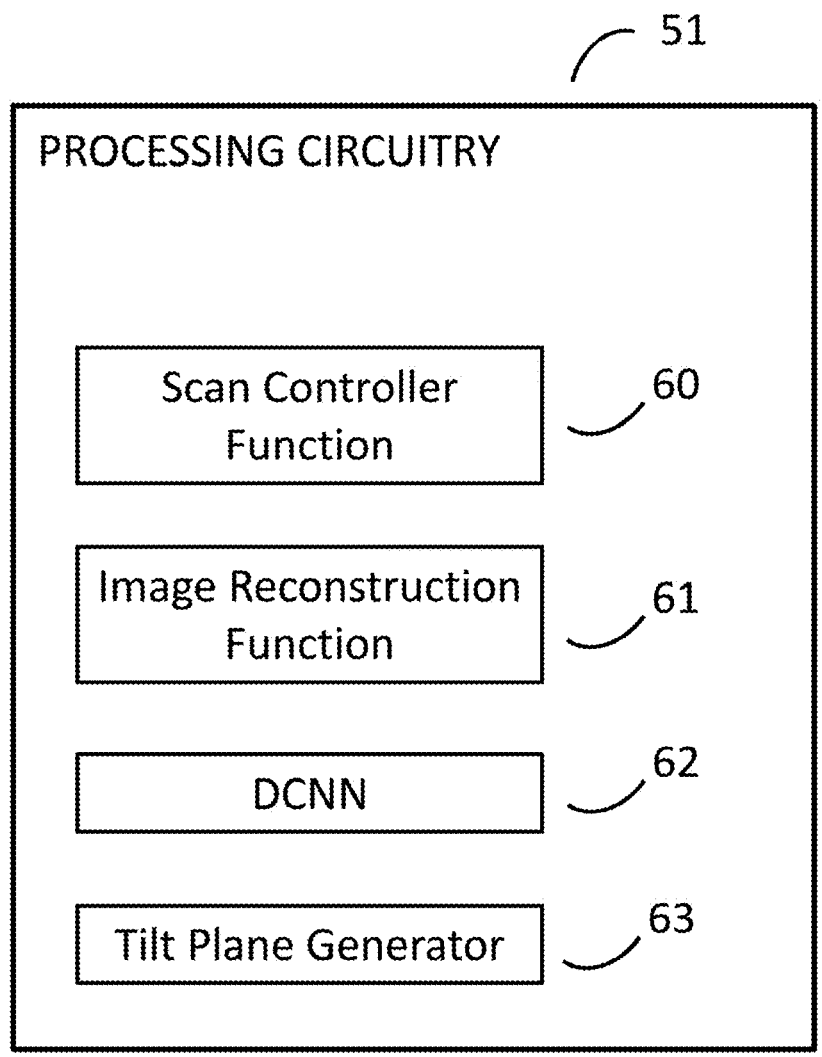
FIG. 3 is a block diagram of the processing circuitry in the CT apparatus of the first embodiment.

Details of processing circuitry 51 are shown in FIG. 3. Processing circuitry 51 includes a scan controller function 60, an image reconstruction function 61, a deep convolutional neural network (DCNN) 62, and a tilt plane generator 63. Each of these functions may be a program stored in memory and executed by the processor or may be hardwired in the processor.

The DCNN 62, described in more detail below, extracts and outputs the points ((x, y, z) coordinates) in the 3D scanogram volume corresponding to the desired biomarkers. The DCNN 62 can also output a scan line or a scan plane. In one embodiment the centers of the supraorbital ridges of the left and right eye and the center of the external auditory meatus are extracted, indicated as P1-P3, respectively. These three points P1-P3 define the desired the scan plane. The supraorbital ridge points P1-P2 can be determined using an average or center of the eye sockets. Other points such as the inner table of the posterior margin of the foramen magnum or the opisthion of the occipital bone can be extracted to define the scan plane. In another embodiment, if a subject has an implant or has had head surgery, the location or region of the implant or surgery may be used as a biomarker if these irradiation of these locations needs to be avoided during the diagnostic scan.

Figure 4A:
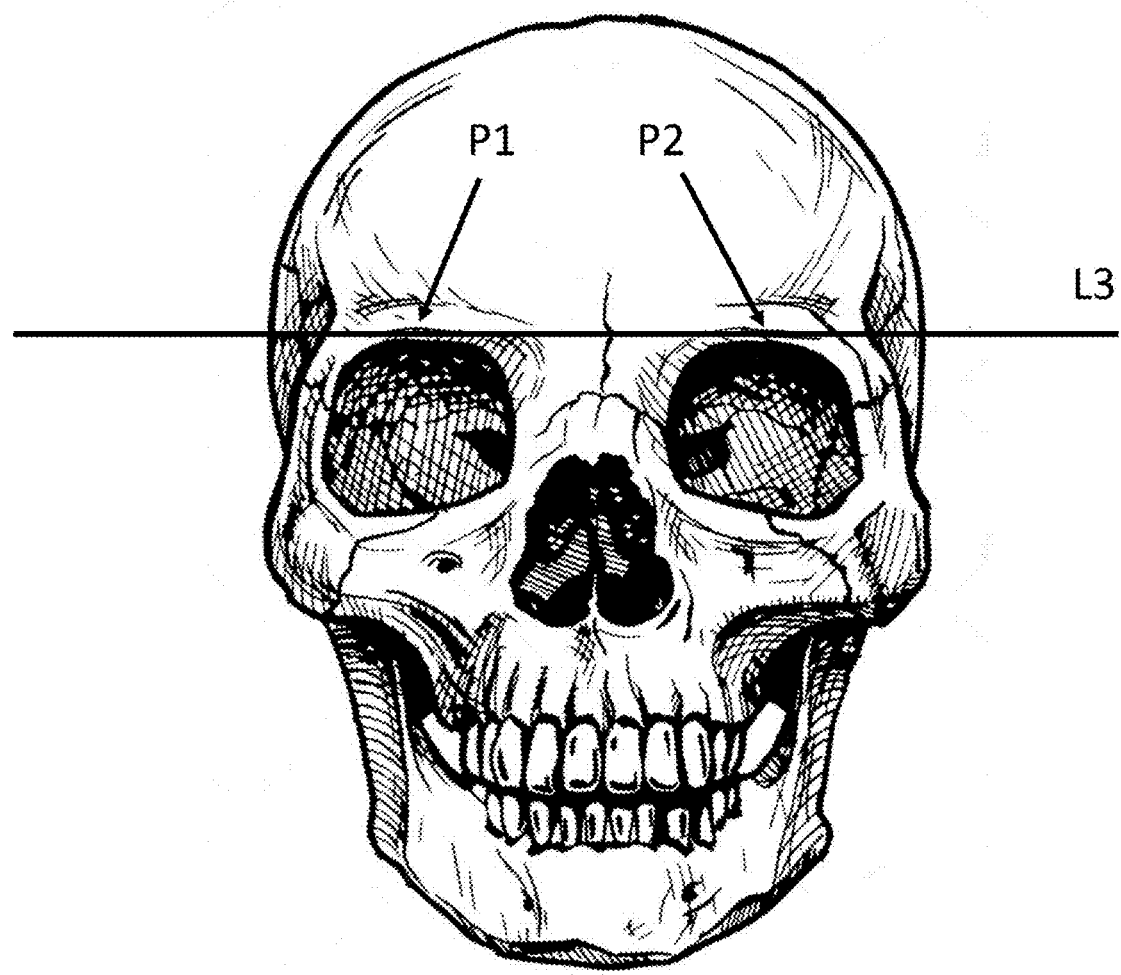
FIGS. 4A-B are schematic diagrams illustrating biomarkers and the tilt lines in first-fourth embodiments of the method, respectively.
Figure 4B:
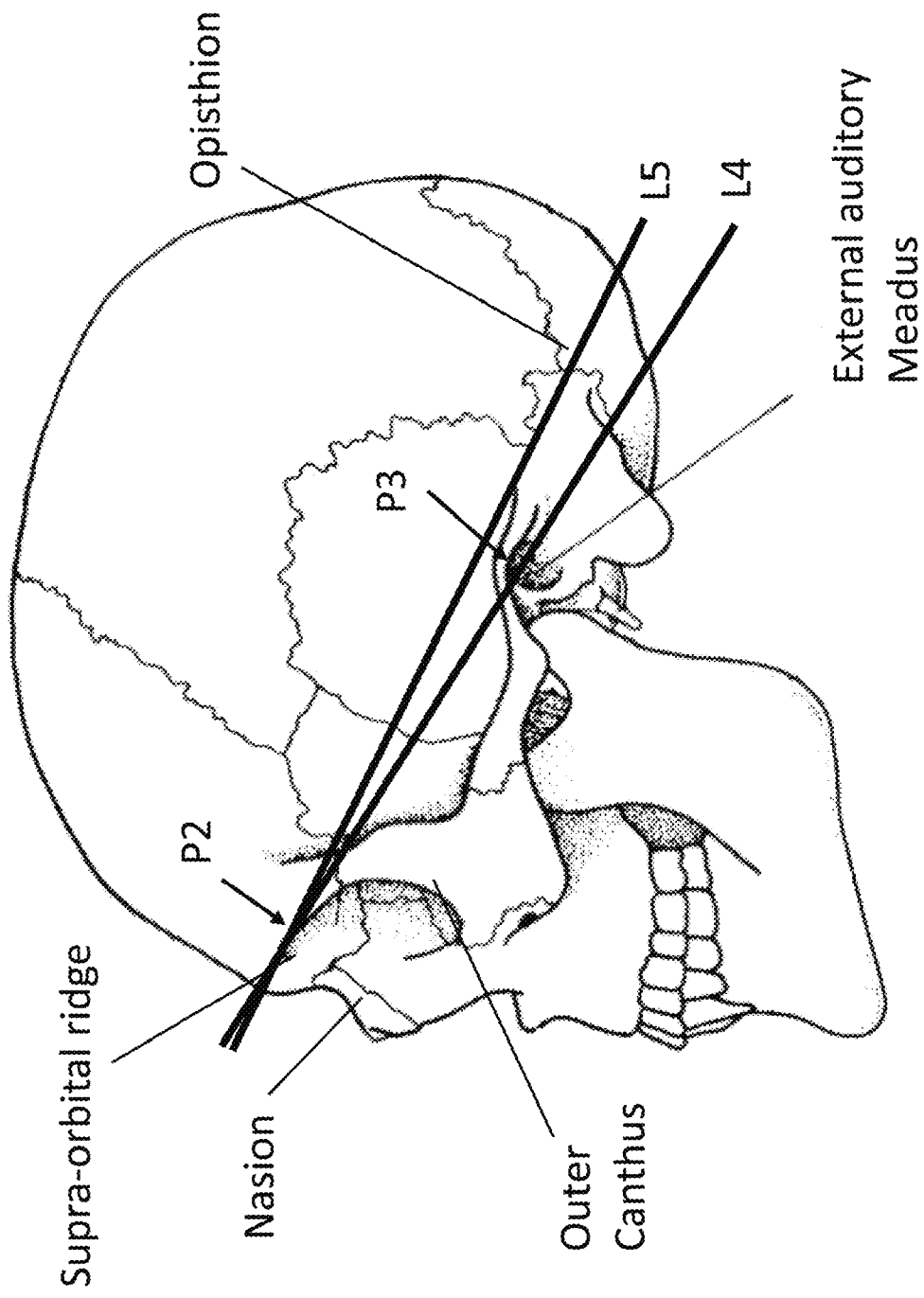

FIGS. 4A and 4B illustrate the biomarkers, the tilt plane, and the tilt line, in one example. FIG. 4A shows a front skull view with the supraorbital ridge points P1-P2 identified. A line L3 between the points is in the scan plane. The OMBL is shown in FIG. 4B as tilt line L4 defined by one of the supraorbital ridge points P2 and the point P3 of the external auditory meatus. The tilt plane is defined by the three points P1-P3 (or the two tilt lines L3-L4). Line L5 shows the tile plane defined by points P1-P2 and a point corresponding to the opisthion of the occipital bone (OO). Either plane can be used to determine the tile plane angle.

Figure 5A:
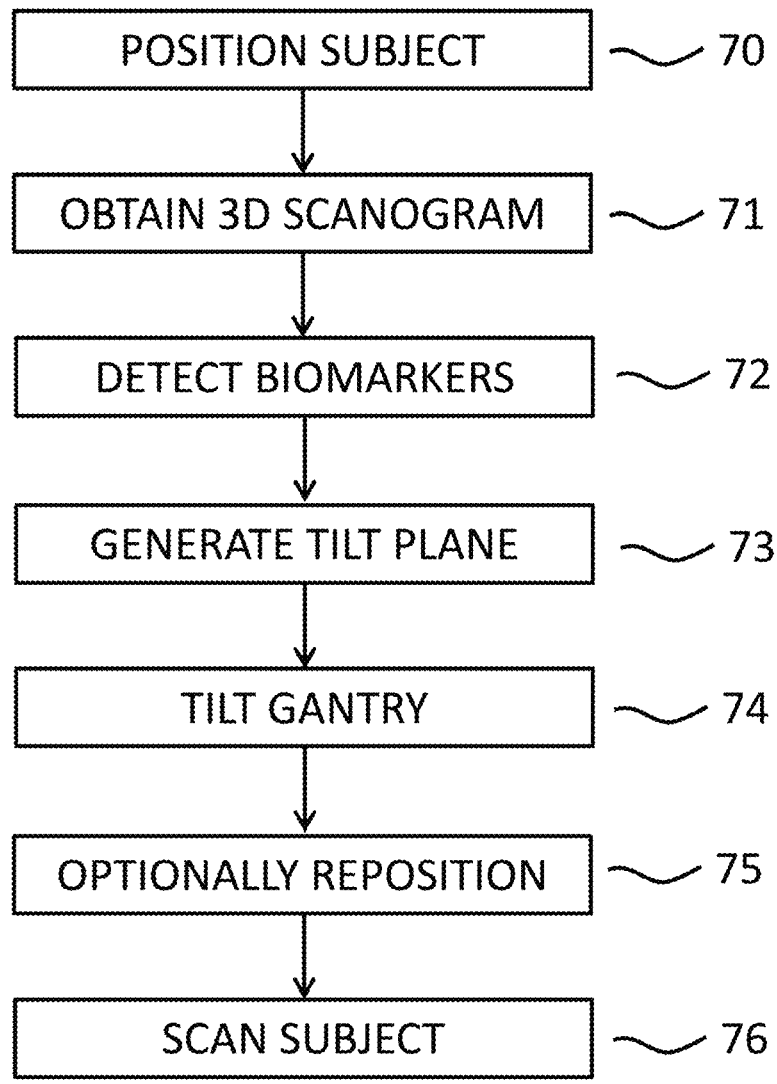
FIGS. 5A-5D are flowcharts illustrating embodiments of the method according to the invention.

The method according to a first embodiment of the present disclosure is shown in the flowchart of FIG. 5A. The subject is placed and positioned in the CT scanner (Step 70) and a 3D scanogram is obtained (Step 71). The 3D scanogram is input to the DCNN 62 of the processing circuitry and biomarkers are extracted from the 3D scanogram (Step 72). For a head CT, these biomarkers can be the opisthion of the occipital bone, external auditory meatus, and the points defined as the center of the supra-orbital ridge of the left and the right eye. See also, for example, American Association of Physicists in Medicine, Adult routine head CT protocols version 2.0 (2016). To avoid or reduce ocular lens exposure, the scan angle can be parallel to a line created by the sub-orbital ridge and the inner table of the posterior margin of the foramen magnum. In one embodiment, the orbitomeatal base line (OMBL) is identified using the supraorbital ridge and the center of the external auditory meatus.

The processing circuitry 51 executes the tilt plane generator function 63 to generate the tilt plane from the coordinates derived from the biomarkers in the scanogram. The orientation of the tilt plane relative to the machine axes is determined by tilt plane generator 63, and the scan controller function 61 generates an instruction to scan controller 45, which controls tilt controller 44 to move the gantry to the appropriate angle and, if needed, an instruction to table driving device 31 to place the subject at the appropriate position, to execute the CT scan at the determined gantry tilt angle and table position to obtain the desired head image while minimizing lens exposure. The gantry tilt angle is preferably, as mentioned above, determined from the plane defined by the biomarkers.

Returning to FIG. 5A, the tilt plane is generated by the processing circuitry in step 73 using the detected biomarkers. The processing circuitry instructs the tilt controller 44 to tilt the gantry in step 74. The processing circuitry also, if needed, can move the subject by sending an instruction to table driving device 31 to position the subject at the appropriate position in the z-direction in step 75. The diagnostic CT scan of the subject is then conducted in step 75. The scout CT scan and the diagnostic CT scan can be parts of one overall scanning operation to increase workflow and to assure that the safety protocols for lens protection are carried out.

Figure 5B:
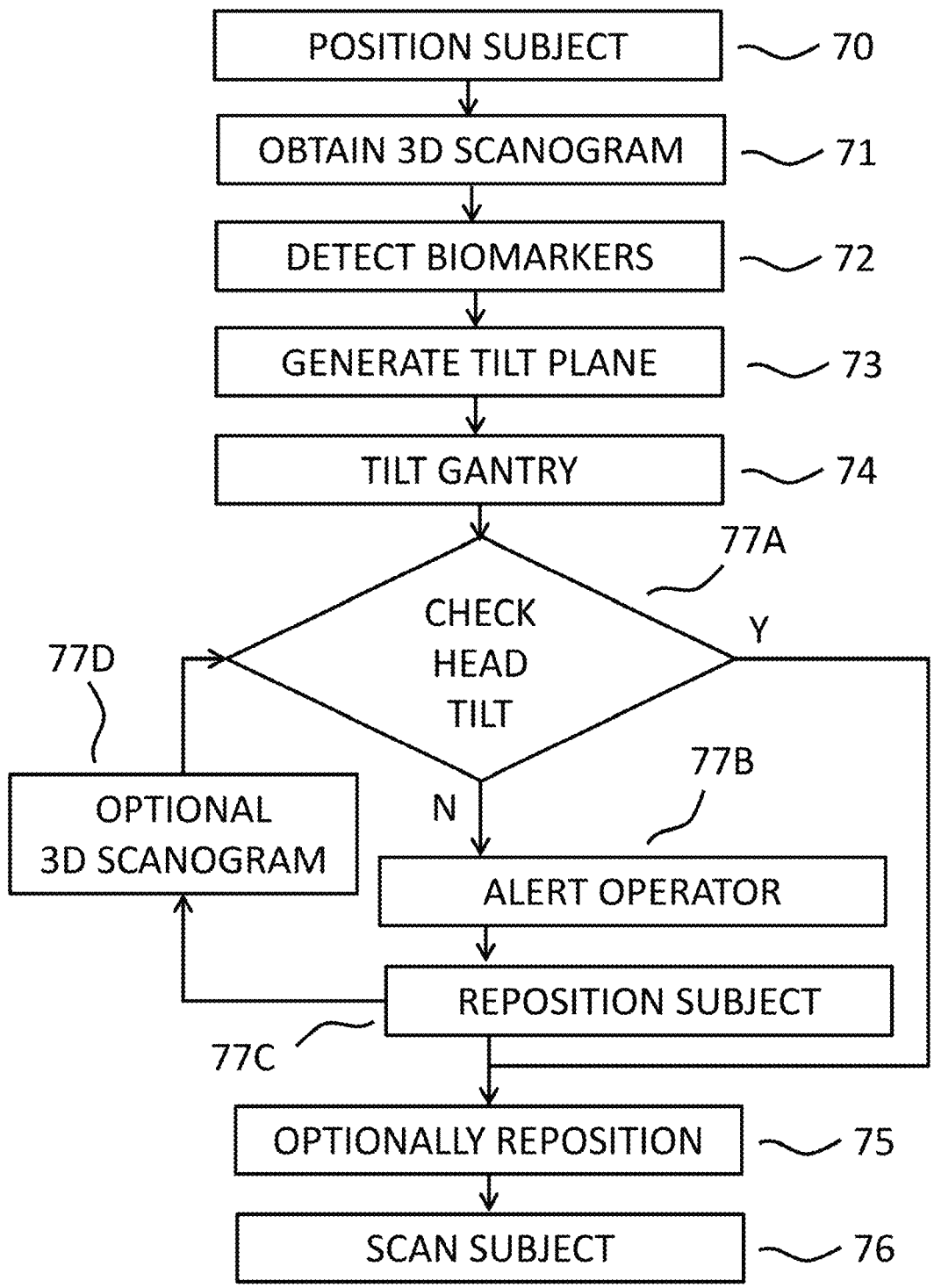

It is also apparent that the angle of lines L3 and L4 can vary with positioning and movement after positioning of the subject. For line L3, if the head of the subject is shifted left or right of the desired position, the determined scan plane could possibly subject one of the lenses to radiation during the diagnostic scan. This is due to the gantry only being configured to be tilted about an axis in the x-direction (see FIG. 2). The gantry of FIG. 2 is not configured to be tilted about an axis in the y-z plane. In a second embodiment shown in FIG. 5B, the apparatus 1 includes the capability to correct the subject positioning.

Figure 4C:
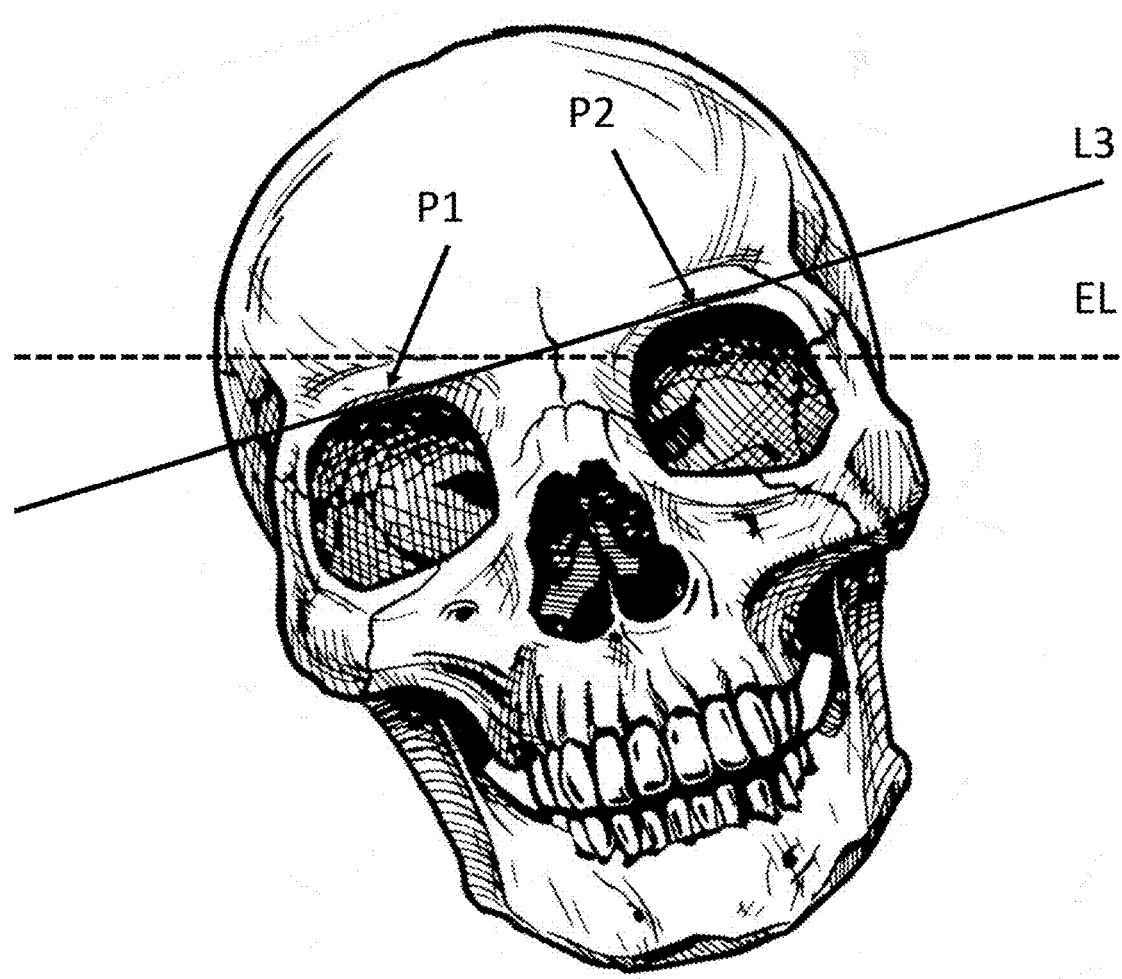
FIGS. 4C-4D illustrate patient shifting.

FIG. 4C illustrates the shifting of the head of the patent and includes an exposure line EL based upon the patient position. The patient is exposed above EL in the figure. The processing circuitry can determine EL from the patient positioning and the machine geometry. With the amount of shift shown in FIG. 4C, the right lens of the patient may be exposed.

Steps 70-74 are the same as in the method of FIG. 5A. After step 74, a check for head tilt is made in step 77A. In one manner, the angle of line L3 in the x-z plane with respect to the x-axis, determined by DCNN 62, is compared to a desired range by processing circuitry 51. If the angle of line L3 is greater than a determined number of degrees from the y-axis, an alert or warning is provided to the operator on display 55 in step 77B. In another manner, the processing circuitry can determine the distance between P1 or P2 and EL perpendicular to EL. If this distance is more than a threshold, such as a few mm, the alert or warning is again provided.

Figure 4D:
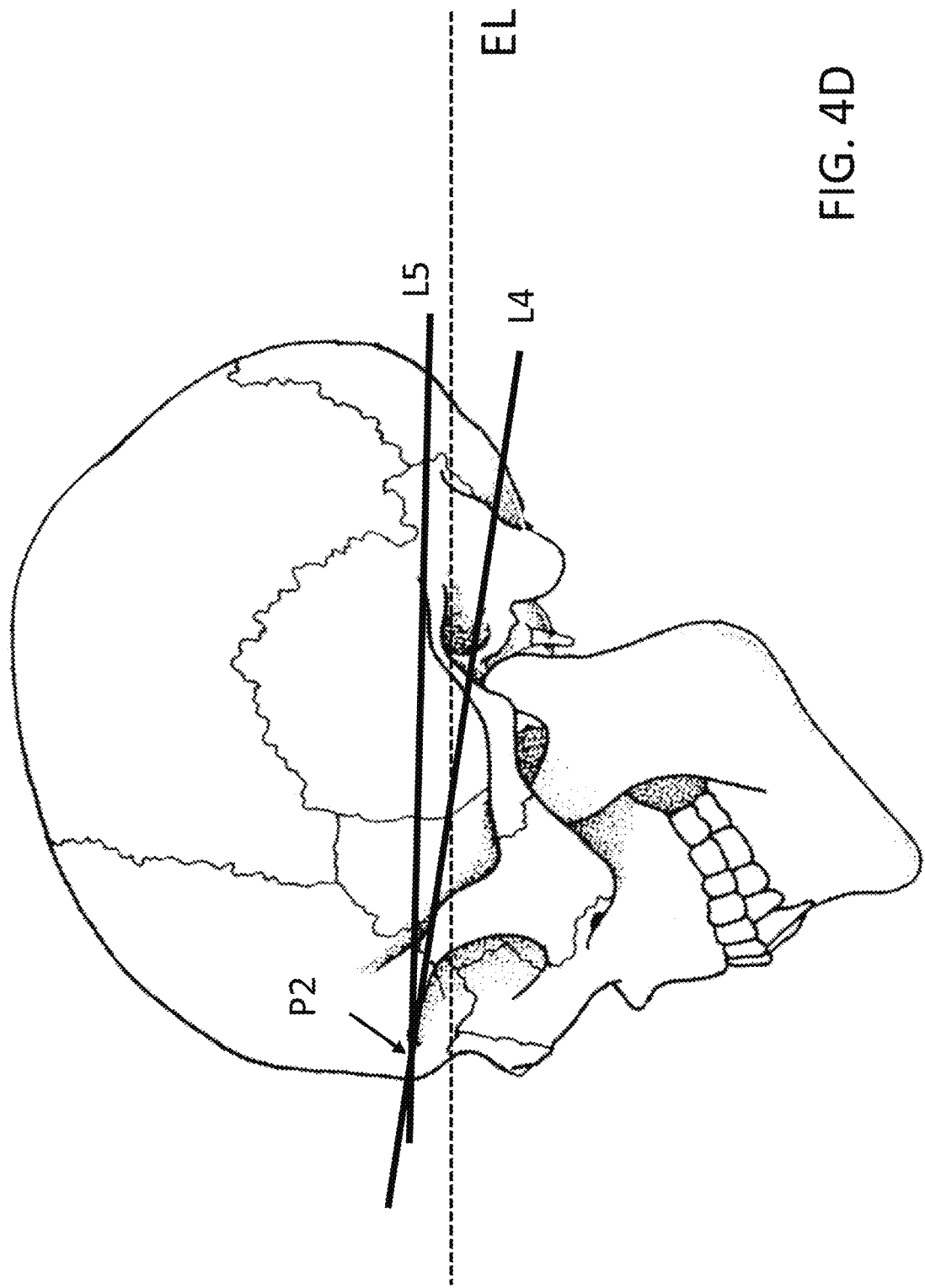

FIG. 4D illustrates the shifting of the head of the patent when the patient move from the desired tucked-chin position and includes an exposure line EL based upon the patient position. The patient is exposed above EL in the figure. The processing circuitry can determine EL from the patient positioning and the machine geometry. With the amount of shift shown in FIG. 4D, the lens of the patient may be exposed. An alert or warning may be given in the same manner as described above in FIG. 4C by checking the angle between L4 or L5 or by determining the distance between P2 and EL perpendicular to EL.

The operator can communicate with the subject using speaker/microphone 46 to reposition the subject in step 77C. If the operator desires, another 3D scanogram can be taken to confirm that the subject is in an appropriate position in step 77D. This process can be repeated if necessary. The subject can be moved to the appropriate z-direction position, if needed, in step 75 and the diagnostic scan is performed in step 76, as in the first embodiment.

Figure 5C:
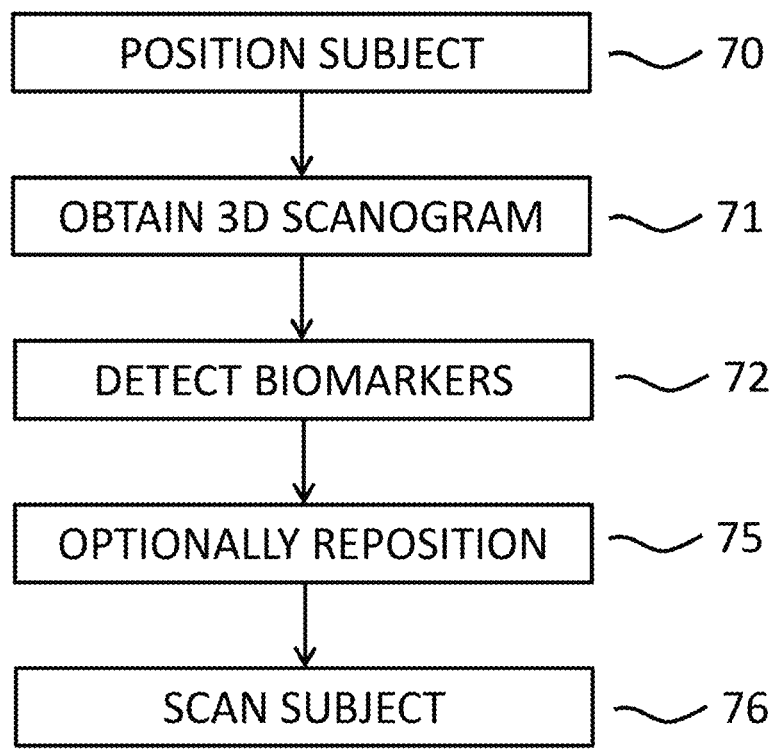
Figure 5D:
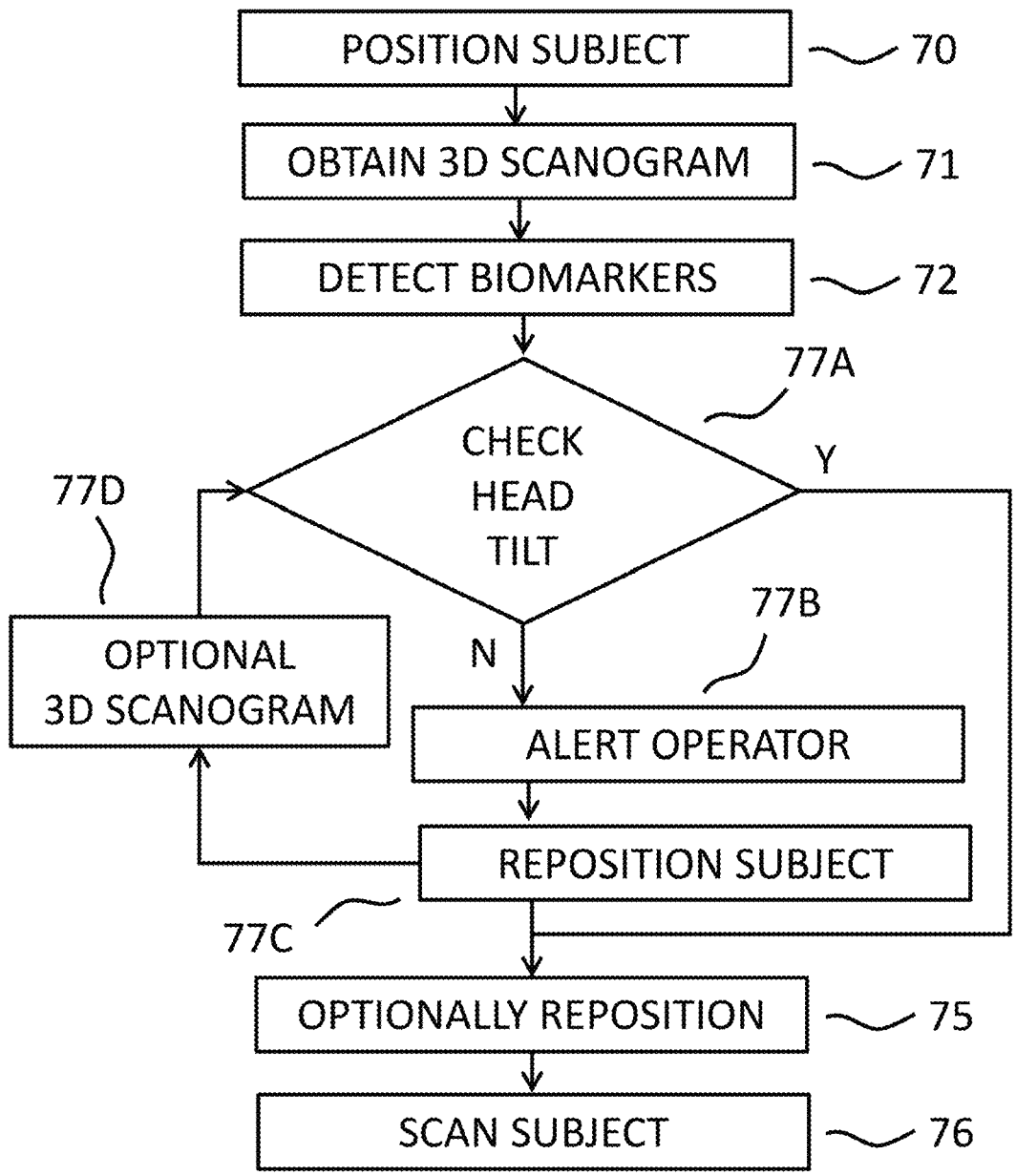

FIGS. 5C and 5D show third and fourth embodiments of the method according to the present disclosure. In these embodiments, the gantry is fixed in the L1 position and does not tilt. For the method of FIG. 5C, in step 70, the subject is positioned typically with tucking the chin down to place the head at the desired angle so that the lenses are not irradiated. Steps 71 and 72, as described above, are performed. Using the biomarkers, the processing circuitry 51 determines the appropriate z-direction position, if needed, in step 75 and the subject is scanned in step 76. The method shown in FIG. 5D is similar to that in FIG. 5B except that steps 73 and 74 are omitted as in the third embodiment.

Figure 6:
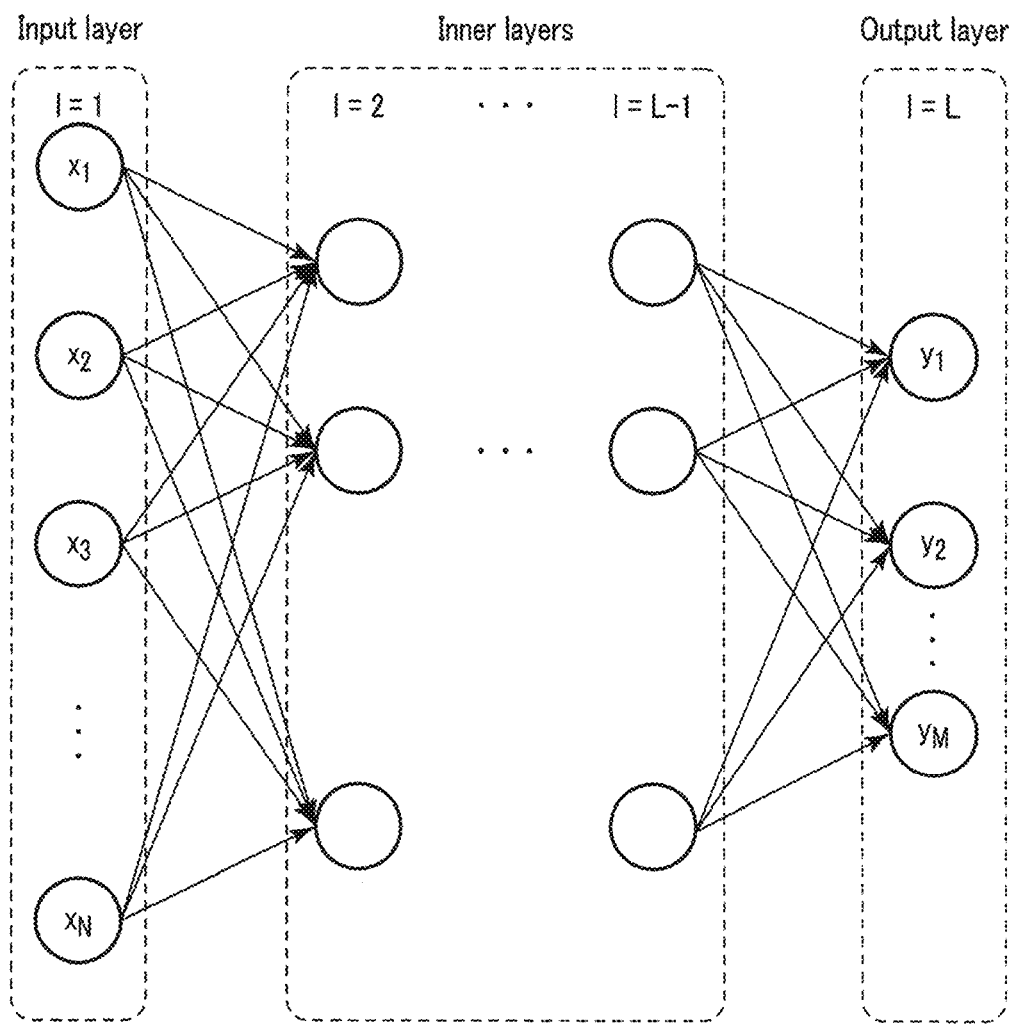
FIG. 6 is a diagram illustrating a neural network in the first embodiment.

An example of the DCNN 62 is shown in FIG. 6. Other neural network structures are possible. The multi-layered network is a network in which multiple layers are arranged in such a manner that only adjacent layers are connected, and information propagates in one direction, from the input layer side toward the output layer side. In FIG. 6, the DCNN 62 has an input layer (I=1), inner layers I=2 to I=L−1, and output layer I=L. Other configurations are possible. The data from the scanogram is input to units of the input layer represented by $x_1$ to $x_N$. The data is processed in the inner layers and an output is generated in the output layer I=L. The layers are given appropriate weights and bias to detect the biomarkers.

Figure 7:
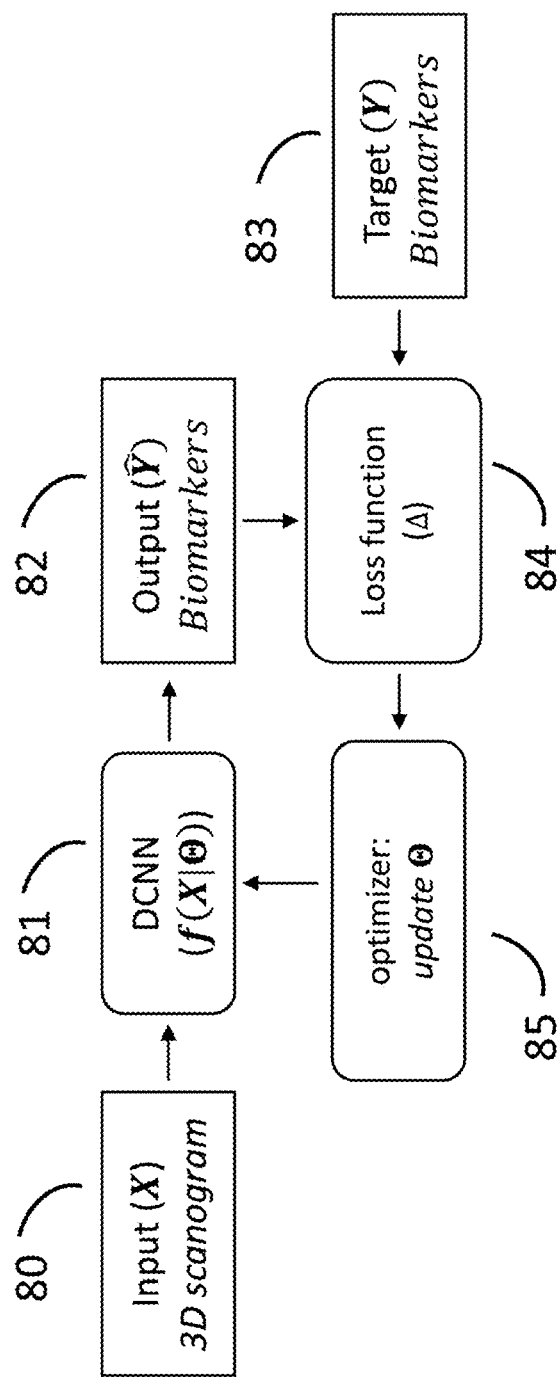
FIG. 7 is a diagram illustrating training of the neural network in the first embodiment.

The weights and biases are determined through a training process, which is illustrated in FIG. 7. The training process for the DCNN is designed to map training input X to desired target Y, as shown above. This training process can be described as solving the following optimization problem:

$$\Theta^* = \operatorname{argmin} \frac{1}{N} \sum_{i=1}^{N} \Delta(f(x_i; \Theta), y_i)$$

where $\Theta$ is the set of parameters of the neural network to be optimized, N is the total number of training instances in training process, f is the neural network to be optimized, $x_i$ is the i-th element of the training input, and $y_i$ is the i-th element of the training target. By solving this optimization problem, one can find the optimal network parameter $\Theta^*$ such that the difference $\Delta$ (could be MAE (mean absolute error), MSE (mean squared error), GDL (generalized dice loss), Dice Loss, cross entropy, etc., for example) between the network output and the target biomarkers Y will be minimized.

Figure 9:
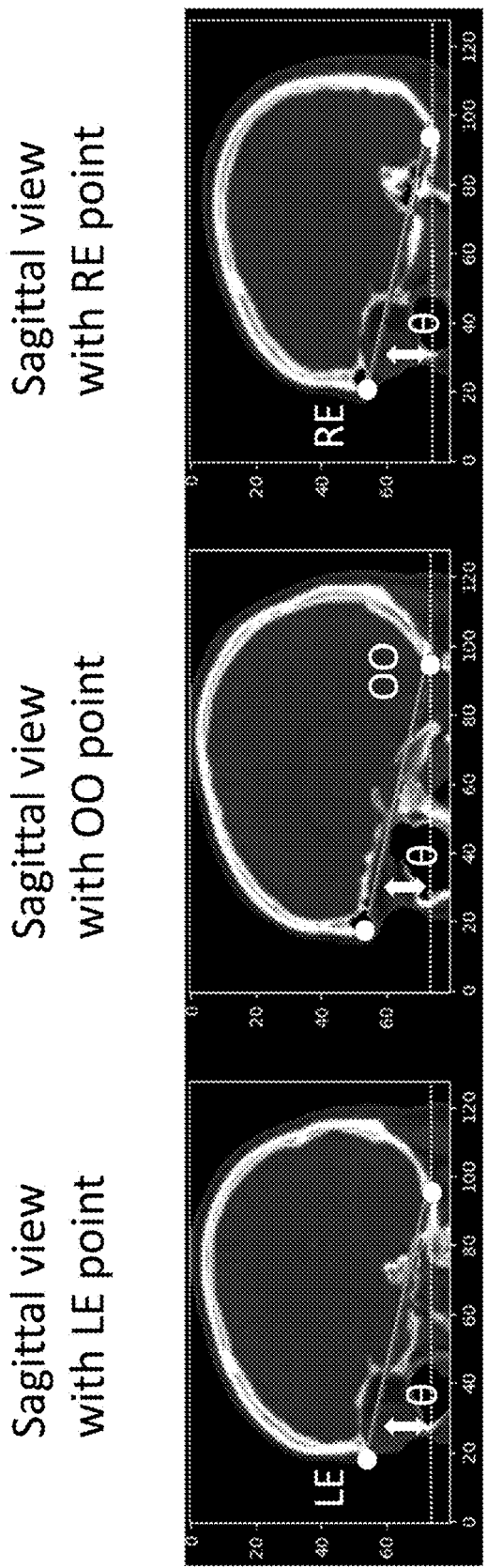
FIG. 9 is a diagram showing three head X-ray CT images with labeled biomarker and tilt plane and the estimated tilt plane.

In FIG. 7, the 3D scanogram 80 is input to the DCNN 81 and biomarkers 82 are generated as outputs of the DCNN 81. Target biomarkers 83 (such as the supraorbital ridge points and the center of the external auditory meatus) are prepared and input to Loss Function 84 where the difference between the generated and the ground truth target biomarkers is determined. The optimizer 85 adjusts the weights and biases of DCNN 81 so as to adjust $\Theta$ such that the difference between the output and target biomarkers is minimized. The inventors assembled a training group of 48 brain CT scans which were manually labeled for finding the coordinates of three landmarks: the opisthion of the occipital bone (OO), and the points defined as the approximate center of the supra-orbital ridge of the left and the right eye, (LE and RE). The testing group consisted of 12 brain CT and 8 real 3D scanogram data sets were also manually labeled with coordinates as the ground truth. The images were preprocessed by down-scaling (×4) and bone thresholding (HU 300~1900 were set as 1, and other features were set to 0. FIG. 9 shows the results. The left, center and right views show the biomarker points determined by the DCNN for the LE, OO, RE, respectively. The horizontal line at the bottom near each view is the machine axis shown for reference, along with the resulting tilt angle (θ) of the plane. The estimated tilt plane is shown with a dashed line and the labeled tilt plane is shown with the solid line. Table 1 below shows the pixel data results for the 12 brain CT data sets with the dFOV=240 or 320 mm, with a 0.5 mm pitch. The estimated biomarker points and tilt planes match up well with the manually labeled points and planes with good accuracy.

TABLE 1

| Metric | Difference (Mean ± Std Dev) |
| --- | --- |
| RE/LE | 1.31 ± 0.73 pixels |
| OO | 2.04 ± 0.99 pixels |
| OO (sagittal plane) | 0.90 ± 0.62 pixels |
| Tilt angle | 1.27 ± 1.06 degrees |

Figure 10:
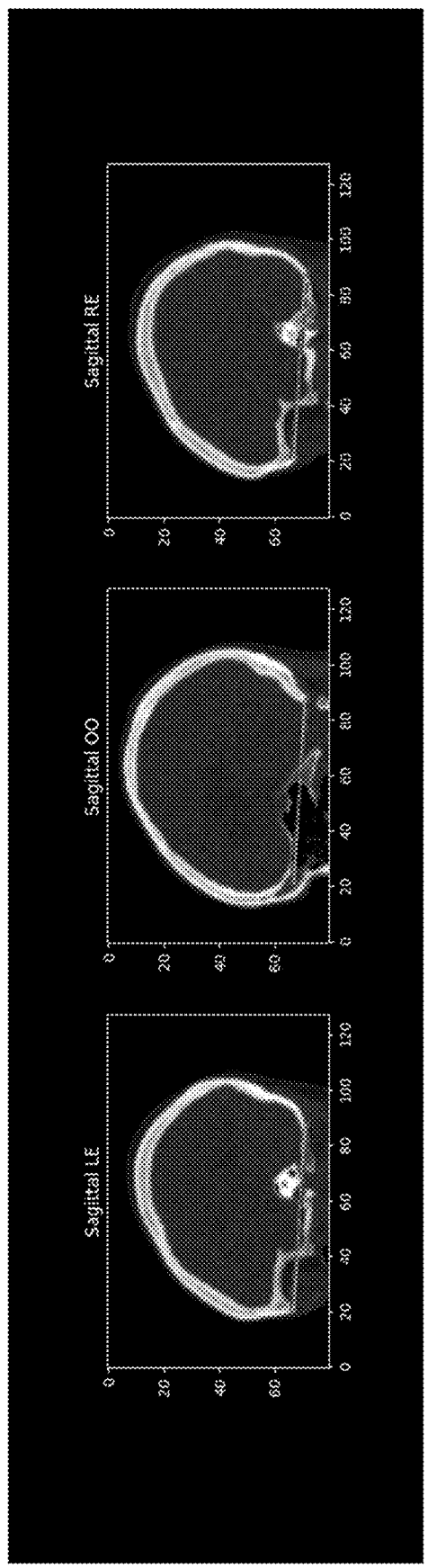
FIG. 10 is a diagram showing labeled and estimated tilt planes.

The inventors also performed tests using 3D scanogram data. Eight data set were used with dFOV=500 mm with 1 mm pitch. The image data was down-sampled (2×) with cropped images of 256×256 pixels. The results are shown in FIG. 10 for the LE, OO and RE. The estimated tilt plane is shown with a dashed line and the labeled tilt plane is shown with the solid line. Again, the tilt plane predicted matches up well with plane of the manually labeled points. Table 2 below shows the pixel data results.

TABLE 2

| Metric | Difference (Mean ± Std Dev) |
| --- | --- |
| RE/LE | 2.12 ± 0.41 pixels |
| OO | 3.54 ± 0.91 pixels |
| OO (sagittal plane) | 1.64 ± 1.15 pixels |
| Tilt angle | 1.47 ± 1.26 degrees |

The results in Tables 1 and 2 and FIGS. 9 and 10 show that the apparatus can accurately estimate the tilt plane (and tilt angle) to safely perform diagnostic head CT scans to avoid unnecessary irradiation of the lenses.

Figure 11:
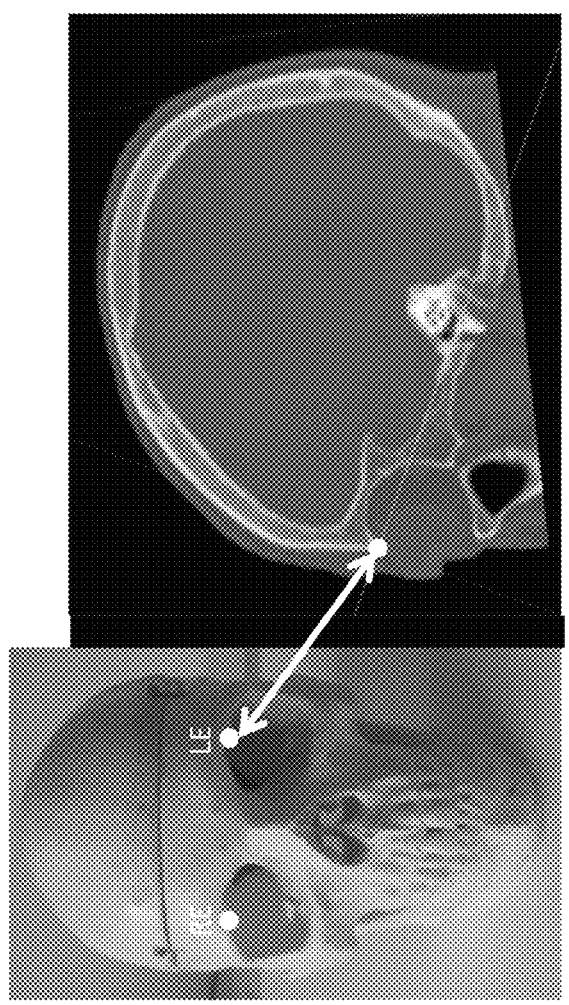
FIG. 11 is a diagram of a phantom used in obtaining the images shown in FIGS. 9-10.

The images shown in FIGS. 9-10 were obtained using the phantom shown in FIG. 11.

Modification

Figure 8:
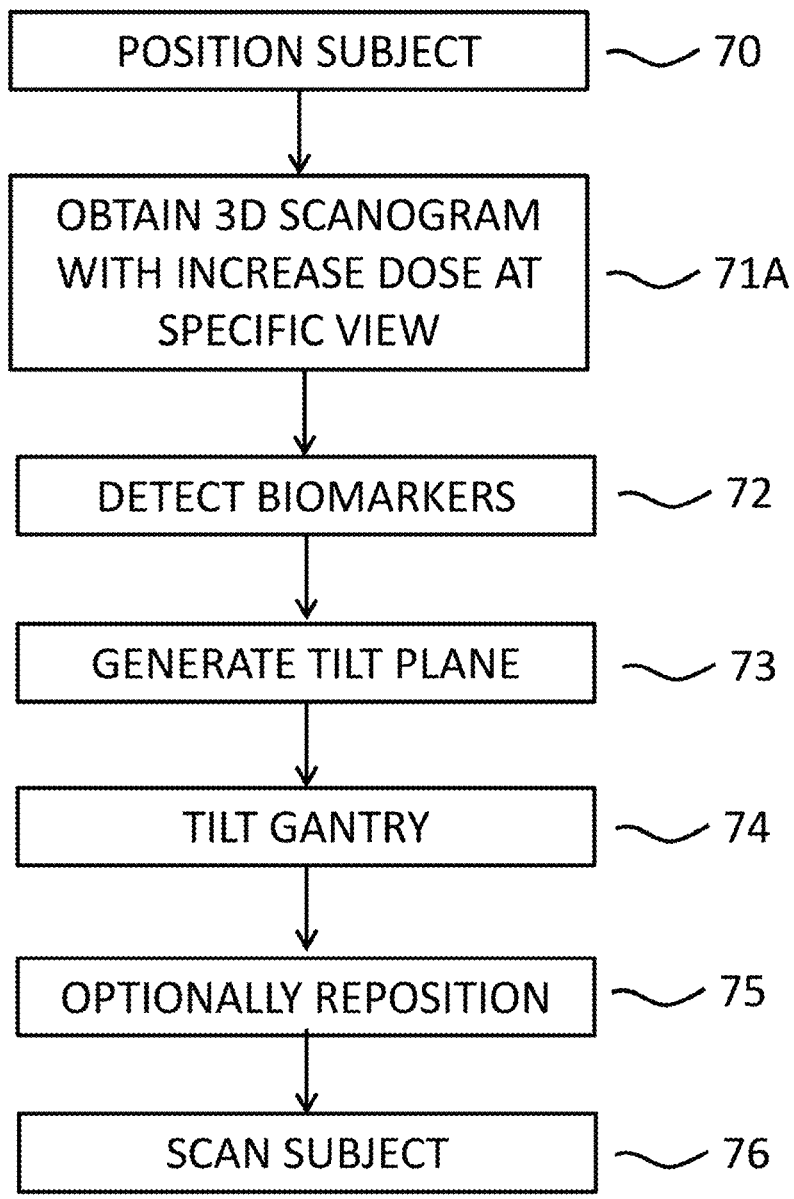
FIG. 8 is a flowchart of a modification of the method for controlling a CT scan according to the first embodiment.

In a modification of the embodiment, two modes of 3D scout scanning are used. In the first mode, the OMBL (or another line) is not detected and the scout scan is performed at a normal 3D scanogram dose. The mode is switched to a second mode at a higher scanogram dose to detect the OMBL. As a second modification, for a specific view acquisition during the 3D scanogram operation, the dose is increased at a specific rotational position in the 3D scanning for detection of the OMBL. This is shown in FIG. 8.

The method and system according to the present disclosure has the advantage of an automatic gantry tilt workflow, which will accelerate the overall subject throughput compared to time-consuming manual tilting. The method and system assures that the lens-protection gantry tilt protocol applied, and decreases the risk of human error for estimating the tilting angle. Compared to conventional gantry tilt approaches, the proposed method and system according to the present disclosure does not alter the current workflow and does not require additional CT scans for positioning and calculating the gantry tilt angle, as the 3D scout scanning and diagnostic scanning are seamlessly performed.

Additional advantages and modifications will readily occur to those skilled in the art. Therefore, the present disclosure in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A method of controlling computed tomography (CT) scanning, comprising:
    performing a scout CT scan of a three-dimensional (3D) region of a head of a subject to be examined, using a CT gantry having an X-ray source and an X-ray detector both rotatably supported thereby, to produce image data;
    detecting anatomical landmarks identifying a tilt plane positioned to avoid irradiation of lenses of the subject during a subsequent diagnostic CT scan by inputting cross-sectional image data of the 3D region generated from the image data to a trained machine learning model;
    determining a tilt angle of the CT gantry based on the detected anatomical landmarks and the tilt plane; and
    performing the diagnostic CT scan of the subject using the CT gantry tilted at the determined tilt angle, wherein the method further comprises:
    identifying a tilt plane passing through supraorbital ridges of the left and right eye of the subject based on the anatomical landmarks,
    determining, based on machine axes of the CT gantry tilted at the determined tilt angle and a position of the head of the subject, an exposure line at the head of the subject,
    determining a distance between supraorbital ridge of the left eye or supraorbital ridge of the right eye of the subject and the exposure line perpendicular to the exposure line, and
    outputting an alert of warning based on a comparison of the determined distance to a threshold.

2. The control method according to claim 1, wherein the CT scout scan and the diagnostic CT scan are performed consecutively in one scanning operation.

3. The control method according to claim 1, wherein performing the CT scout scan comprises increasing an X-ray dosage for a specific view acquisition having a specific rotational position so as to detect the anatomical landmarks.

4. The control method according to claim 1, further comprising determining the tilt plane using an orbitomeatal base line (OMBL) of the subject.

5. The control method according to claim 1, further comprising determining the tilt plane using the supraorbital ridges and an opisthion of the subject.

6. The control method according to claim 1, further comprising determining a position of the head of the subject using the anatomical landmarks.

7. The control method according to claim 1, further comprising:
    determining a position of the subject on a movable table associated with the CT gantry with respect to a scan plane of the tilted CT gantry; and
    moving the subject so that a desired scan plane though the head of the subject aligns with the scan plane of the tilted CT gantry.

8. The control method according to claim 1, further comprising:
    determining a line of the tilt plane passing through the supraorbital ridges of the left and right eye;
    determining whether an angle of the line is within a predetermined number of degrees of one of machine axes of the CT gantry; and
    when the line is not within the predetermined number of degrees, outputting an alert of warning.

9. A method of controlling computed tomography (CT) scanning, comprising:
    performing a scout CT scan of a three-dimensional (3D) region of an object to be examined, using a CT gantry having an X-ray source and an X-ray detector both rotatably supported thereby, to produce image data;
    identifying anatomical landmarks in the image data by inputting cross-sectional image data of the 3D region generated from the image data to a trained machine learning model;
    determining a tilt angle of the CT gantry based on the identified anatomical landmarks; and
    performing a diagnostic CT scan of the object using the CT gantry tilted at the determined tilt angle, wherein the method further comprises:
    identifying a tilt plane passing through a predetermined object based on the anatomical landmarks, determining, based on machine axes of the CT gantry tilted at the determined tilt angle, an exposure line on the object, determining a distance between the predetermined object and the exposure line perpendicular to the exposure line, and outputting an alert of warning based on a comparison of the determined distance to a threshold.

10. The control method according to claim 9, wherein performing the CT scout scan and performing the diagnostic CT scan are performed consecutively in one scanning operation.

11. The method according to claim 9, further comprising:
generating an anatomical line using the anatomical landmarks; and
determining the tilt angle based upon the generated anatomical line.

12. The method according to claim 11, wherein the anatomical line is an orbitomeatal base line.

13. The method of claim 9, wherein performing the scout CT scan further comprises:
performing a first scout CT scan configured for scan planning with OMBL detection, or a second scout CT scan configured for scan planning without OMBL line detection,
wherein the first CT scout scan is performed with a higher X-ray dose than the second scout scan.

14. A computed tomography (CT) apparatus, comprising:
a gantry;
an X-ray source mounted on the gantry;
an X-ray detector mounted on the gantry;
a memory storing a trained model configured to detect anatomical landmarks; and
processing circuitry configured to
instruct the apparatus to perform a scout CT scan of a three-dimensional (3D) region of an object to be examined to produce image data;
input the image data to the trained model to detect anatomical landmarks;
determine a tilt angle of the CT gantry based on the detected anatomical landmarks; and
perform a diagnostic CT scan of the object using the CT gantry tilted at the determined tilt angle, wherein
the processing circuitry is further configured to
identify a tilt plane passing through a predetermined object based on the anatomical landmarks,
determine, based on machine axes of the CT gantry tilted at the determined tilt angle, an exposure line on the object,
determine a distance between the predetermined object and the exposure line perpendicular to the exposure line, and
output an alert of warning based on a comparison of the determined distance to a threshold.

15. The apparatus according to claim 14, wherein the processing circuitry is further configured to control the apparatus to perform, as the scout scan, a first scout CT scan configured for scan planning with orbitomeatal base line (OMBL) detection, or a second scout CT scan configured for scan planning without OMBL detection,
wherein the first CT scout scan is performed with a higher X-ray dose than the second scout scan.

16. The apparatus according to claim 14, wherein the processing circuitry is further configured to perform the CT scout scan and the diagnostic CT scan consecutively in one scanning operation.

17. The apparatus according to claim 14, wherein the processing circuitry is further configured to:
generate an anatomical line using the anatomical landmarks; and
determine the tilt angle based upon the generated anatomical line.

18. The apparatus according to claim 14, wherein the processing circuitry is further configured to determine the tilt angle using an orbitomeatal base line (OMBL) of the object.

19. The apparatus according to claim 14, wherein the processing circuitry is further configured to determine the tilt angle using a supraorbital ridge and an opisthion of the object.

* * * * *